(12) United States Patent
Yonehara et al.

(10) Patent No.: US 12,479,961 B2
(45) Date of Patent: Nov. 25, 2025

(54) COMB POLYMER HAVING SALT GROUPS

(71) Applicant: BYK-Chemie GmbH, Wesel (DE)

(72) Inventors: Hiroshi Yonehara, Hyogo (JP); Andreas Okkel, Wesel (DE); Benjamin Lindner, Rüdenhausen (DE); Shinji Hino, Osaka (JP); Sabine Stelz, Oberhausen (DE); Ryo Takabayashi, Hyogo (JP)

(73) Assignee: BYK-Chemie GmbH, Wesel (DE)

( * ) Notice: Subject to any disclaimer, the term of this patent is extended or adjusted under 35 U.S.C. 154(b) by 252 days.

(21) Appl. No.: 18/281,322

(22) PCT Filed: Apr. 5, 2022

(86) PCT No.: PCT/EP2022/059035
§ 371 (c)(1),
(2) Date: Sep. 11, 2023

(87) PCT Pub. No.: WO2022/214502
PCT Pub. Date: Oct. 13, 2022

(65) Prior Publication Data
US 2024/0158582 A1    May 16, 2024

(30) Foreign Application Priority Data

Apr. 7, 2021 (EP) .................... 21167235

(51) Int. Cl.
| | | |
|---|---|---|
| *C08G 81/02* | (2006.01) | |
| *C09D 7/45* | (2018.01) | |
| *C09D 7/65* | (2018.01) | |
| *C09D 11/102* | (2014.01) | |
| *C09D 11/326* | (2014.01) | |
| *H01M 4/62* | (2006.01) | |

(52) U.S. Cl.
CPC ............ *C08G 81/025* (2013.01); *C09D 7/45* (2018.01); *C09D 7/65* (2018.01); *C09D 11/102* (2013.01); *C09D 11/326* (2013.01); *H01M 4/62* (2013.01)

(58) Field of Classification Search
None
See application file for complete search history.

(56) References Cited

U.S. PATENT DOCUMENTS

| | | | |
|---|---|---|---|
| 3,575,861 | A | 4/1971 | Pratt |
| 5,639,141 | A | 6/1997 | Hanemaayer |
| 7,078,464 | B2 | 7/2006 | Schmidhauser |
| 8,129,476 | B2 | 3/2012 | Goebelt |
| 2004/0002562 | A1 | 1/2004 | Schmidhauser |
| 2015/0152211 | A1 | 6/2015 | Göbelt |
| 2016/0060171 | A1* | 3/2016 | Frunz ............... C04B 28/02 526/287 |

FOREIGN PATENT DOCUMENTS

| | | |
|---|---|---|
| DE | 2726854 | 1/1979 |
| EP | 0193019 | 9/1986 |
| JP | S6248838 | 3/1987 |
| JP | 3789965 | 6/2006 |
| WO | 2008080580 | 7/2008 |
| WO | 2008122606 | 10/2008 |
| WO | 2013189568 | 12/2013 |
| WO | 2019096891 | 5/2019 |

OTHER PUBLICATIONS

International Preliminary Report on Patentability for International Application No. PCT/EP2022/059035 dated Mar. 23, 2023.
International Search Report and Written Opinion for International Application No. PCT/EP2022/059035 dated Sep. 12, 2022.

* cited by examiner

*Primary Examiner* — Khanh T Nguyen

(57) ABSTRACT

The invention relates to a comb polymer having a polymer backbone and lateral side chains linked to the polymer backbone, wherein the lateral side chains comprise a) alkyl ether terminated polyalkylene oxide side chains, and b) tertiary amine-functional side chains, wherein the tertiary amine groups are at least partly neutralized by an acid having a molecular weight in the range of 100 g/mol to 2000 g/mol, wherein the molecular weight relates to the number average molecular weight Mn in the case of polymeric acids, and wherein the lateral side chains a) and b) are distributed in random order.

14 Claims, No Drawings

COMB POLYMER HAVING SALT GROUPS

The invention relates to a comb polymer having alkyl ether terminated polyalkylene oxide side chains and neutralized tertiary amine-functional side chains, to a composition comprising the comb polymer and at least one colorant, and to the use of the comb polymer as a wetting- and/or dispersing agent for solid particles.

U.S. Pat. No. 7,078,464 describes a composition comprising an unsaturated carboxylic acid salt of an amine functionalized styrene-maleic anhydride copolymer. The use thereof a pigment dispersant is described as well. Preferred unsaturated carboxylic acids are acrylic acid and methacrylic acid.

WO 2008/080580 describes modified comb copolymers prepared by reaction of SMA resins with a polyalkylene oxide monoamine and a primary tertiary diamine. The tertiary amine groups are at least partially converted to quaternary ammonium salts. The modified comb copolymers are suitable as pigment dispersant resins.

WO 2013/189568 describes copolymers and their use as wetting and dispersing agent. The copolymers are prepared by reacting a main chain polymer with primary amines or alcohols, each having at least one tertiary amine group, followed by quaternization. In some embodiments, the main chain polymer may be modified with a polyalkylene oxide monoamine.

There is an ongoing need to for polymers suitable for use as wetting and dispersing agents, and which provide improved properties to water-borne and organic solvent-based pigment dispersions. In particular, there is a need for pigment dispersions having a low viscosity, a good storage stability, and a broad compatibility with different kind of binders used in coating compositions and other pigmented compositions. Pigment dispersions for the manufacture of color resists for flat panel displays need to provide improved developing properties and good re-solubility. The polymers should be easy to prepare from readily available raw materials, preferably without the need to employ sensitive polymerization techniques.

The invention provides a comb polymer having a polymer backbone and lateral side chains linked to the polymer backbone, wherein the lateral side chains comprise
a) alkyl ether terminated polyalkylene oxide side chains, and
b) tertiary amine-functional side chains, wherein the tertiary amine groups are at least partly neutralized by an acid having a molecular weight in the range of 100 g/mol to 2000 g/mol, wherein the molecular weight relates to the number average molecular weight Mn in the case of polymeric acids, and wherein the lateral side chains a) and b) are distributed in random order.

The comb polymer of the invention is suitable for use as wetting and dispersing agent and provides improved properties to water-borne and organic solvent-based pigment dispersions. The comb polymer leads to pigment dispersions having a low viscosity, a good storage stability, and a broad compatibility with different kind of binders used in coating compositions and other pigmented compositions. When used for pigment dispersions for the manufacture of color resists for flat panel displays, improved developing properties and good re-solubility are observed. The polymers are easy to prepare from readily available raw materials, without the need to employ sensitive polymerization techniques.

The polymer of the invention comprises a polymer backbone. The polymer backbone is a linear or branched polymer having repeating units. Preferably, the polymer backbone has a substantially or entirely linear structure. Generally, the type of polymer which forms the polymer backbone is not particularly limited and can be chosen from the polymer types know to the skilled person. Examples of suitable polymer types include polyesters, polyurethanes, polycarbonates, and polymers and copolymers of polymerizable ethylenically unsaturated monomers. In view of the wide variety of available ethylenically unsaturated monomers having further functional groups, polymers and copolymers, collectively referred to as (co)polymers, of such monomers are preferred as polymer backbone. Examples of suitable ethylenically unsaturated monomers are vinylesters, vinylethers, vinylaromatic compounds, such as styrene, acrylic and methacrylic acid as well as esters and amides thereof, collectively referred to as (meth)acrylates. Suitable monomers also include maleic and fumaric acid, as well as derivatives thereof, such as anhydrides, esters, amides, and imides.

In preferred embodiments, the polymer backbone comprises polymerized units of vinylaromatic hydrocarbon monomers, in particular, styrene.

It is further preferred that the polymer backbone comprises polymerized units of N-substituted maleic imide. It is particularly the preferred that the lateral side chains a) and b) are linked to the polymer via the nitrogen atom of the polymerized units of N-substituted maleic imide.

In the polymer of the invention lateral side chains are linked to the polymer backbone. Generally, the lateral side chains are covalently linked to the polymer backbone. The resulting structure may also be referred to as comb polymer.

Typically, two or more lateral side chains are covalently linked to the polymer backbone.

The lateral side chains comprise alkyl ether terminated polyalkylene oxide side chains.

The alkyl ether generally comprises alkyl groups having 1 to 32 carbon atoms. The alkyl groups may be linear or branched. The alkyl groups may likewise contain cyclic groups. In preferred embodiments, the alkyl groups have 1 to 8 carbon atoms.

The polyalkylene oxide groups generally have a number average molecular weight in the range of 88 to 5000 g/mol. In a preferred embodiment, 132 to 4000 g/mol, more preferably 132 to 2000 g/mol. The number average molecular weight can be determined by gel permeation chromatography.

The polyalkylene oxide groups comprise polymerized units of alkylene oxides. The alkylene oxides are preferably selected from ethylene oxide, propylene oxide, and combinations thereof. It is particularly preferred, that the polyalkylene oxide groups comprise or consist of polymerized units of ethylene oxide. If the polyalkylene oxide side chains comprise polymerized units of more than one type of alkylene oxide, such units can be arranged statistically, as a gradient, or in blocks. The number of polymerized alkylene oxide units in the polyalkylene oxide side chains generally is in the range of 1 to 114, such as 3 to 91, or 4 to 45.

In one embodiment, the individual lateral chains have the same type of alkyl ether terminated polyalkylene oxide groups. In other embodiments, lateral chains with different types of such groups may be present.

The lateral side chains comprising alkyl ether terminated polyalkylene groups are generally linked to the polymer backbone via a linking group. Examples of suitable linking groups are ester groups, amide groups, and imide groups. In preferred embodiments, the alkyl ether terminated polyalkylene oxide side chains are linked to the polymer backbone via an imide group.

The comb polymer of the invention further comprises tertiary amine-functional lateral side chains. The tertiary amine-functional side chains comprise tertiary amine groups. Generally, these side chains contain one tertiary amine group per side chain. The tertiary amine groups comprise linear, branched or cyclic alkyl groups linked to the amine nitrogen. In typical embodiments, the alkyl groups have 1 to 18 carbon atoms per alkyl group, preferably 1 to 8 carbon atoms. In some embodiments, the alkyl groups may form a cyclic structure with the amine nitrogen.

The lateral side chains comprising tertiary amine groups are generally linked to the polymer backbone via a linking group. Examples of suitable linking groups are ester groups, amide groups, and imide groups. In preferred embodiments, the tertiary amine-functional lateral side chains are linked to the polymer backbone via an imide group.

The amount of tertiary amine groups in the comb polymer of the invention is generally selected such that the comb polymer has an amine value in the range of 5 to 150 mg KOH/g. Preferably, the amine value is at least 10 mg KOH/g, and more preferably at least 15 mg KOH/g. Preferably, the amine value of the comb polymer is at most 120 mg KOH/g, and more preferably at most 100 mg KOH/g. The amine values relate to the non-volatile content of the comb polymer. In a very preferred embodiment, the amine value of the comb polymer is in the range of 15 to 100 mg KOH/g.

The lateral side chains a) comprising alkyl ether terminated polyalkylene groups and the lateral side chains b) comprising tertiary amine groups are distributed in random order. This means that these lateral side chains a) and b) are located along the polymer backbone without a particular order or structure, as opposed to block copolymers, wherein specific structures are present in identifiable segments of the copolymer, and absent in other segments.

In the comb polymer of the invention the tertiary amine groups are at least partly neutralized by an acid having a molecular weight of at least 100 g/mol. The acid can be a monomeric acid or a polymeric acid. If the acid is a polymer, the molecular weight relates to the number average molecular weight Mn. The number average molecular weight can suitably be determined by gel permeation chromatography.

In preferred embodiments, the acid has a molecular weight of at least 150 g/mol. Generally, the acid has a molecular weight of 2000 g/mol or less, preferably 1500 g/mol or less. In some embodiments, the molecular weight of the acid is 1000 g/mol or less. Although the acid may be present in the form of a polymer, it is not generally suitable as a film-forming binder. The acidic group of the acid is generally selected from carboxylic acid groups, acidic groups containing phosphorus, and sulfonic acid groups. Examples of acidic groups containing phosphorus include phosphonic acid groups, and mono- and diesters of phosphoric acid. In embodiments wherein the acidic group contains phosphorus, the acid preferably has a molecular weight in the range of 250 to 2000 g/mol.

The acid may contain 1, 2 or more acidic groups per molecule. It is preferred that the molecules contain 1 or 2 acidic groups per molecule. The number of acidic groups per molecule can also be expressed as average functionality, i.e. the number of acid groups in a sample divided by the number of molecules in a sample. Preferably, the average functionality is in the range of 0.9 to 1.2 acidic groups per molecule.

Examples of suitable acids are fatty acids, for example fatty acids having 8 to 18 carbon atoms. So far very good results have also been obtained with sulfonic acids, in particular, aromatic sulfonic acids, such as para toluene sulfonic acid.

When the acid is a polymeric acid, it suitably comprises a polyether segment or a polyester segment.

A polymeric acid may be a linear or branched polymer. Preferably, it is an essentially linear polymer. Polymeric acid may be based on one or more types of monomers. In some embodiments, a polymeric acid comprises ester groups. A polymeric acid may be a polyester, for example a polyester based on dicarboxylic acids, diols, and optionally monoalcohols, monocarboxylic acids, and combinations thereof. If branched polyesters are desired, it is possible to include ester forming building blocks having three or more ester-forming functional groups. Alternatively, polymers containing ester groups can be prepared by ring-opening polymerization of lactones. Examples of suitable lactones include epsilon-caprolactone and delta-valerolactone.

In further embodiments, a polymeric acid comprises ether groups. A polymeric acid may be a polyether, for example a polyether prepared by ring opening polymerization of cyclic ether groups, such as epoxides and oxetanes. Examples of suitable epoxides include ethylene oxide, propylene oxide, glydicylethers, glycidylesters, and mixtures thereof. Suitable oxetanes include unsubstituted oxetane or a substituted oxetane, such as trimethylolpropaneoxetane. Polymerization of hydroxyl-functional cyclic ethers may lead to branched polyether structures.

In a further embodiment, a polymeric acid comprises ester groups and ether groups. In one embodiment, a polymeric acid may be a block copolymer comprising at least one polyether block and at least one polyester block. Alternatively, ester groups and ether groups may be distributed randomly.

Acidic groups may be introduced in a polymer by well-known methods.

Acidic phosphoric acid esters are suitably prepared by reacting one phosphoric acid equivalent of an ester-forming phosphorus compound with one to two equivalents of a hydroxyl-functional polymer.

If one equivalent of a mono hydroxyl functional polymer is used for each phosphoric acid equivalent of an ester-forming phosphorus compound, monoesters form. If two equivalents are used, diesters are formed. If between one and two equivalents are used, a mixture of monoesters and diesters is formed.

As used herein, the term "ester-forming phosphorus compound" is understood to refer to a phosphorus compound which can form a phosphoric acid ester by reaction with a hydroxy compound. For example, phosphorus oxychloride, phosphorus pentoxide, polyphosphoric acid and acetyl phosphate can be used as ester-forming phosphorus compounds. Additional examples are given in German Patent Application No. DE-A 2,726,854. Phosphorus pentoxide and polyphosphoric acid are preferred.

The reaction of the aforementioned ester-forming phosphorus compounds with the hydroxy compounds is preferably carried out without a solvent, at temperatures up to about 100° C. However, the reaction can also be carried out in the presence of suitable inert solvents, as described, for example, in European Patent Application EP 0193019 A.

Polymers having carboxylic acid groups are suitably prepared by reacting a hydroxyl functional or primary or secondary amine functional polymer with a cyclic carboxylic anhydride. Examples of suitable cyclic carboxylic anhydrides include maleic anhydride, itaconic anhydride, citraconic anhydride, succinic anhydride, and phthalic anhydride. Alternatively, the ring-opening polymerization of lactones may be started with a carboxylic acid to yield a carboxylic acid functional polyester.

Polymers having sulfonic acid groups may be prepared by treatment of polymers having alkyl groups with sulfur dioxide and oxygen in the presence of radical forming agents, by oxidation of thiol functional polymers, or by treatment of halide functional polymers with sodium sulfate and subsequent acidification.

Generally, at least 5 mol-% of the tertiary amine groups of the comb polymer are neutralized by an acid having a molecular weight of at least 100 g/mol. In preferred embodiments, at least 10 mol-% of the tertiary amine groups of the comb polymer are neutralized. It is particularly preferred, that 15 to 100 mol-%, most preferred 20 to 100 mol-%, of the tertiary amine groups are neutralized. In some embodiments, the amount of acid employed for neutralization of the tertiary amine groups can higher than the theoretical amount to neutralize 100 mol-% of the tertiary amine groups. However, generally the amount of acid is in the range of 5 to 130% of the theoretical amount required to neutralize the tertiary amine groups.

The neutralization of the tertiary amine groups may suitably be carried out by combining the comb polymer and the acid, and mixing the two components. The comb polymer or the acid, or both, may suitably be provided as solutions in one or more organic solvents to reduce the viscosity and to facilitate handling and mixing. Neutralization and salt formation is believed to be facilitated by keeping the composition at ambient temperature or at elevated temperature for certain period of time. In exemplary embodiments, the composition is kept, after mixing, at a temperature in the range of 20 to 80° C. for a period of 20 minutes to 24 hours to equilibrate salt formation.

The comb polymer of the invention generally has a low content of quaternary amine groups or is entirely free of such groups. In typical embodiments, 0.0 to 4.0 mol-%, preferably 0.0 to 0.5 mol-% of all nitrogen atoms in the polymer are present as quaternary ammonium groups.

The comb polymer of the invention can suitably be prepared from a base polymer having suitable functional groups to attach the lateral side chains. In preferred embodiments, the base polymer is a copolymer of styrene and maleic anhydride. Such copolymers can be prepared by well-known methods, for example radical polymerization processes. Copolymers of styrene and maleic anhydride are also commercially available.

The lateral side groups a) may be linked to the styrene maleic anhydride base copolymer by reacting the base copolymer with suitable modifiers a).

In one embodiment, the modifiers a) are polyalkylene oxide monoamines that are $C_1$-$C_4$ alcohol-started polyethers that are constructed from ethylene oxide and/or propylene oxide and carry a primary amino group: the ratio by weight of ethylene oxide units to propylene oxide units is frequently between 5:95 and 100:1, preferably between 30:70 and 70:30. The number-average molecular weight of the polyalkylene oxide monoamines is typically between 500 g/mol and 3000 g/mol.

In a further embodiment, modifiers a) are monohydroxy-terminated polyethers: they can be prepared, for example, by alkoxylating monofunctional alcohols such as alkanols, cycloalkanols, phenols with alkylene oxides such as ethylene oxide, propylene oxide, butylene oxide, styrene oxide, aliphatic or aromatic glycidyl ethers such as isopropyl glycidyl ether, butyl glycidyl ether, allyl glycidyl ether, 2-ethylhexyl glycidyl ether, cresyl glycidyl ether and phenyl glycidyl ether. Mixtures of these raw materials can also be used. In the case of mixed polyethers, they can be arranged statistically, in gradient form or in blocks. These polyethers frequently have a number-average molecular weight (M a) in the range from approximately 100 to 25,000, particularly frequently from 150 to 15,000, and particularly typically from 200 to 10,000 g/mol. Polyethers based on ethylene oxide, propylene oxide or their mixtures are preferred.

The lateral side groups b) may be linked to the styrene maleic anhydride base copolymer by reacting the base copolymer with suitable modifiers b).

Examples of suitable modifiers b) include polyamine compounds which contain a primary amine group and at least one tertiary amine group. Suitable diamines include, for example, N,N-dialkylaminoalkyl amines. A preferred diamine is N,N-dimethylaminopropyl amine. Among other amines that could be used are diethyl amino propyl amine (DEAPA), dimethyl amino butyl amine (DMABA), dimethyl amino ethyl amine (DMAEA), amino propyl morpholine, and diisopropyl amino propyl amine (DIAPA).

As mentioned above, the comb polymer of the invention is very suitable as a wetting- and/or dispersing agent for colorants.

Therefore, the invention further relates to a composition comprising
  (A) the comb polymer of the invention,
  (B) at least one colorant, and
  (C) at least one diluent.

Suitable colorants include pigments, dyes, and opaqueness providing fillers, and combinations thereof.

Examples of suitable colorants are described in international patent application PCT/EP2018/081346, page 9, line 30 to page 13, line 16, and JP 6248838 B, Page 6, line 32 to page 9, line 33. In addition, Pigment Red-291, Pigment Yellow-231, and Pigment Green-62, Pigment Green-63, Raven 5000 Ultra 2 (Birla Carbon product), Raven 5000 Ultra 3 (Birla Carbon product), COLOUR BLACK FW 100 (Orion Engineered Carbons product), COLOUR BLACK FW 171 (Orion Engineered Carbons product), COLOUR BLACK FW 200 (Orion Engineered Carbons product), COLOUR BLACK FW 255 (Orion Engineered Carbons product), COLOUR BLACK FW 310 (Orion Engineered Carbons product), Denka black and other carbon blacks which are used for battery application, single-walled carbon nanotube or multi-walled carbon nanotube may be mentioned as a very suitable colorant.

The composition further comprises at least one diluent. Suitable diluents include water, organic liquids, and mixtures thereof. Examples of organic liquids include organic solvents, which are typically volatile liquids which decrease the viscosity of the composition. Examples of organic solvents include dialkyl ketones, alkyl esters of alkane carboxylic acids and alkanols, especially such liquids containing up to, and including, a total of 6 or 8 carbon atoms. Specific examples include dialkyl and cycloalkyl ketones, such as acetone, methyl ethyl ketone, diethyl ketone, diisopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

In further embodiments, the solvent comprises aliphatic groups, aromatic groups or mixtures thereof. Examples include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics e.g., vegetable oil, sunflower oil, linseed oil, terpenes and glycerides.

Further examples of organic liquids include so-called reactive diluents. Reactive diluents are organic liquids having functional groups capable of participating in chemical curing reactions. Examples of reactive diluents include glycidyl ethers and glycidyl ester having one or more epoxide groups, and esters of acrylic or methacrylic acid having one or more (meth)acryloyl groups.

If so desired, further components may be included in the composition. Examples of further components include film-forming binders, other resins and polymers, reactive diluents and solvents, curing catalysts, as well as further additives. The choice of further components depends on the intended use of the colored composition. In exemplary embodiments, the colored composition is formulated as an inkjet ink composition, as an automotive basecoat composition, or as a composition for color filters, in particular, color filters for flat panel displays.

The compositions which are coating compositions or inks can be used in various application fields, like automotive coatings, construction coatings, protective coatings (like marine or bridge coatings), can and coil coatings, wood and furniture coatings, industrial coatings, plastics coatings, wire enamels, foods and seeds coatings, or leather coatings (both for natural and artificial leather). Coating materials include pasty materials which typically have a high content of solids and a low content of liquid components, e.g., pigment pastes or effect pigment pastes (using pigments based on aluminum, silver, brass, zinc, copper, bronzes like gold bronze, iron oxide-aluminum); other examples of effect pigments are interference pigments and pearlescent pigments like metal oxide-mica pigments, bismuth oxide chloride or basic lead carbonate.

When the colored composition is formulated as a color filter composition, it is preferred that an alkali-soluble resin is included in the composition. Examples of suitable alkali-soluble resins are described in international patent application PCT/EP2018/081346, page 14, line 20 to page 15, line 21, and JP 6248838 B, Page 11, line 20 to page 13, line 6.

Compositions for color filters for flat panel displays preferably also comprise an ethylenically unsaturated component having one or more ethylenically unsaturated groups. Examples of such components are described in international patent application PCT/EP2018/081346, page 15, line 23 to page 16, line 33.

Preferably, the composition further comprises a film-forming binder (D).

In an example, said film-forming binder may be any suitable organic polymer depending on the intended use of the composition. The film-forming binder may be selected from any suitable thermoplastic polymer and any suitable crosslinkable polymer.

Examples of suitable thermoplastic polymers are poly (meth)acrylates, polyacrylonitrile, polystyrene, styrenic plastics (e.g. ABS, SEBS, SBS), polyesters, polyvinyl esters, polycarbonates, polyethylene terephthalate, polybutylene terephthalate, polyamides, thermoplastic polyurethanes (TPU), polyvinyl chloride, polyoxymethylene, polyethylene or polypropylene.

A crosslinkable film-forming binder as defined herein has at least one crosslinkable functional group. Any customary crosslinkable functional group known to the skilled person is contemplated here. More particularly suitable crosslinkable functional groups include hydroxyl groups, amino groups, carboxylic acid groups, and unsaturated carbon double bonds, isocyanates, polyisocyanates, and epoxides such as glycidyl ethers. The crosslinkable film-forming binder may be exothermically or endothermically crosslinkable or curable. The crosslinkable film-forming binder is crosslinkable or curable preferably in a temperature range from −20° C. up to 250° C. The crosslinkable film-forming binder preferably selected at least one of epoxide resins, polyesters, wherein the polyesters may be unsaturated, vinyl ester-based resins, poly(meth)acrylates, polyurethanes, polyureas, polyamides, polystyrenes, polyethers, polycarbonates, polyisocyanates, and melamine formaldehyde resins. Such film-forming binders and their preparation are known to the skilled person.

The invention further relates to the use of the comb polymer according to the invention as a wetting- and/or dispersing agent for solid particles.

Preferably, the solid particles comprise at least one of pigments, dyes, and fillers, as mentioned above.

The invention also relates to a process of dispersing solid particles in a dispersion medium, wherein the comb polymer of the invention is included in the dispersion medium. The process typically comprises mixing the solid particles, the comb polymer of the invention, and the dispersion medium while applying shear force.

EXAMPLES

Raw Materials

SMA 1000: Styrene-maleic anhydride copolymer (molar ratio of styrene/maleic anhydride=1/1) (Polyscope)
SMA 2000: Styrene-maleic anhydride copolymer (molar ratio of styrene/maleic anhydride=2/1) (Polyscope)
SMA 3000: Styrene-maleic anhydride copolymer (molar ratio of styrene/maleic anhydride=3/1) (Polyscope)
Styrene: (Sigma-Aldrich)
Maleic anhydride: (Sigma-Aldrich)
α-MSD: α-Methylstyrene dimer (Sigma-Aldrich)
AMBN: 2,2'-Azobis(2-methylbutyronitrile) (Sigma-Aldrich)
PMA: 1-Methoxy-2-propyl acetate (DOW Chemicals)
PM: 1-Methoxy-2-propylalcohol (DOW Chemicals)
Jeffamine M 2070: Amine-terminated EO/PO polyether (Huntsman)
Jeffamine M 2005: Amine-terminated EO/PO polyether (Huntsman)
DMAPA: N,N-Dimethylaminopropylamine (Huntsman)
BzCl: Benzyl chloride (Sigma-Aldrich)
BzBr: Benzyl bromide (Sigma-Aldrich)
Lutensol AO11: C13-C15 Alkoxylated polyethyleneglycol (number of ethyleneoxide unit: 11) (BASF)
MPEG-350: Methoxy polyethylene glycol (number of ethyleneoxide unit: 8) (Sigma-Aldrich)
ε-Caprolactone: (Sigma-Aldrich)

δ-Valerolactone: (Sigma-Aldrich)
KOH: Potassium hydroxide (Sigma-Aldrich)
DBSA: Dodecylbenzenesulfonic acid (Sigma-Aldrich)
Phosmer M: (2-Methacryloyloxy)ethyl phosphate (Uni-Chemical), theoretical molecular weight=210.12 g/mol
MAA Methacrylic acid (Sigma-Aldrich), theoretical molecular weight=86.06 g/mol
PTSA p-toluene sulfonic acid, theoretical molecular weight=172.12 g/mol
BA Benzoic acid, theoretical molecular weight=122.12 g/mol Gel Permeation Chromatography (GPC)

Number-average Mn and weight-average Mw molecular weights and the molecular weight distribution were determined according to DIN 55672-1:2007-08 at 35° C. using a high-pressure liquid chromatography pump (WATERS 600 HPLC pump) and a refractive index detector
(Waters 410). As separating columns, a combination was used of 3 Styragel columns from WATERS with a size of 300 mm×7.8 mm ID/column, a particle size of 5 μm, and pore sizes HR4, HR2 and HR1. The eluent used was tetrahydrofuran with 1% by volume of dibutylamine, with an elution rate of 1 mL/min. The conventional calibration was carried out using polystyrene standards.

Measurement of Non-Volatile Content (Solids Content)

The sample (1.0±0.2 g of the tested substance) was weighed accurately into a previously dried aluminum dish and approximately 2 ml of Ethanol was added. After being homogenized, it is dried for 20 minutes at 150° C. in the varnish drying cabinet, cooled in a desiccator and then reweighed. The residue corresponds to the solids content in the sample (ISO 3251).

Measurement of the Amine Value 1.5 to 3.0 g of a sample was precisely weighed out into a 80 mL beaker and is dissolved with 50 mL of acetic acid. Using an automatic titration device provided with a pH electrode, this solution was neutralization-titrated with a 0.1 mol/L $HClO_4$ acetic acid solution. A flexion point of a titration pH curve was used as a titration endpoint, and an amine value was obtained by the following equation.

Amine value[mg KOH/g]=$(561×0.1×f×V)/(W×S)$ (wherein f: factor of titration agent, V: titration amount at titration endpoint [mL], W: weighed amount of sample [g], S: solid matter concentration of sample [wt %])

Measurement of the Acid Value 1.5 to 3.0 g of a sample was precisely weighed out into a 80 mL beaker and is dissolved with 50 mL of ethanol. Using an automatic titration device provided with a pH electrode, this solution was neutralization-titrated with a 0.1 mol/L ethanolic KOH solution. A flexion point of a titration pH curve was used as a titration endpoint, and an amine value was obtained by the following equation.

Acid value[mg KOH/g]=$(561×0.1×f×V)/(W×S)$ (wherein f: factor of titration agent, V: titration amount at titration endpoint [mL], W: weighed amount of sample [g], S: solid matter concentration of sample [wt %])

Measurement of Total Acid Value 1.5 to 3.0 g of a sample was precisely weighed out into a 80 mL beaker and is dissolved in 40 mL of pyridine and 10 mL of deionized water. A lid was equipped with the 80 mL beaker, and it was heated at 70° C. in a temperature-control block with stirring or in a water bath for 60 min. After Cooling down, the solution was neutralization-titrated with a 0.1 mol/L aqueous NaOH solution by using an automatic titration device provided with a pH electrode. A flexion point of a titration pH curve was used as a titration endpoint, and an amine value was obtained by the following equation.

Total Acid value[mg KOH/g]=$(561×0.1×f×V)/(W×S)$ (wherein f: factor of titration agent, V: titration amount at titration endpoint [mL], W: weighed amount of sample [g], S: solid matter concentration of sample [wt %])

Synthesis of Styrene-Maleic Anhydride Copolymer (I-SMA 1000/I-SMA 1081)

51.4 g of PMA were added into a reaction vessel, and heated up to 120° C. while stirring. Then, 18.3 g of maleic anhydride, 19.5 g of styrene and 2.1 g of AMBN dissolved in 8.7 g of PMA were added dropwise to the reaction vessel. The reaction was carried at 120° C. for one hour. After cooling down, styrene-maleic anhydride copolymer (I-SMA 1000) was obtained.

I-SMA 1000 had 40% of solid content, and 211 mg KOH/g of total acid value.

Synthesis of Styrene-Maleic Anhydride Copolymer (I-SMA 2000)

3.7 g of α-MSD and 37.9 g of PMA were added into a reaction vessel, and heated up to 130° C. while stirring. Then, 14.8 g of maleic anhydride, 26.9 g of styrene and 2.1 g of AMBN dissolved in 14.6 g of PMA were added dropwise to the reaction vessel. The reaction was carried at 130° C. for one hour. After cooling down, styrene-maleic anhydride copolymer (I-SMA 2000) was obtained.

I-SMA 2000 had 47.5% of solid content, and 150 mg KOH/g of total acid value.

Synthesis of Aminic Comb-Like Copolymer C-1

39.5 g of I-SMA 2000 was added into a reaction vessel, and the mixture was heated up to 70° C. with stirring. Then, 35.5 g of Jeffamine M 2070 and 3.9 g of DMAPA were added dropwise to the reaction vessel. The reaction was carried at 170° C. for 4 hours. PMA was distilled off during the reaction.

Synthesis of Aminic Comb-Like Copolymer C-2-C-8

Aminic comb-like copolymer C-2-C-8 were synthesized using the same procedure as used for aminic comb-like copolymer C-1, except using different types and amounts of monomers related to side chain, pigment affinic groups and additional solvent if required (Details were described in Table 1).

Synthesis of Aminic Random Copolymer RC-1

85.0 g of PMA was added into a reaction vessel. Then, 52.8 g of SMA 1000 was added during stirring, while the mixture was heated up to 70° C. Then, 7.2 g of DMAPA were added dropwise to the reaction vessel. The reaction was carried at 170° C. for 4 hours. PMA was distilled off during the reaction.

Synthesis of Quaternized Comb-Like Copolymer QC-1

38.5 g of comb-like copolymer C-1, 58.6 g of PMA and 2.9 g of benzyl chloride were added into a reaction vessel, and the reaction vessel was heated up to 120° C. The quaternization reaction was carried out at 120° C. for 4 hours. After that, a quaternized comb-like copolymer QC-1 was obtained.

The quaternized comb-like copolymer QC-1 had a 40% of solid content and 4 mg KOH/g of an amine value of polymer.

Synthesis of Quaternized Comb-Like Copolymer QC-2-QC-4

Quaternized comb-like copolymer QC-2-QC-6 were synthesized using the same procedure as used for quaternized comb-like copolymer QC-1, except using different types and amounts of quaternization agents and solvents (Details were described in Table 2).

Preparation of Waterborne Comb-Like Copolymer WC-1

50.0 g of comb-like copolymer C-1 and 50.0 g of deionized water were added into a reaction vessel, and the reaction vessel was heated up to 100° C. with stirring. The distillation of PMA and deionized water from the mixture was carried out at 100° C. for 6 hours with reduced pressure. After cooling down to 60° C., 50.0 g of deionized water added into the reaction vessel and the distillation procedure was carried out several times. After adding a suitable amount of deionized water to adjust a solid content, a waterborne comb-like copolymer WC-1 was obtained.

The waterborne comb-like copolymer WC-1 had a 40% of solid content and 36 mg KOH/g of an amine value of polymer.

Synthesis of Acidic Polymer AP-1

0.3 g of KOH, 77.5 g of MPEG-350 and 22.2 g of succinic anhydride were added into a reaction vessel, and the reaction vessel was heated up to 80° C. Synthesis of acidic polymer AP-1 was carried out at 80° C. for 1 hour.

Acidic polymer AP-1 had 100% of solid content, 124 mg KOH/g of acid value of polymer and 450 g/mol of theoretical molecular weight.

Synthesis of Acidic Polymer AP-2

86.0 g of Lutensol A011 and 14.0 g of PAA were added into a reaction vessel, and the reaction vessel was heated up to 80° C. Synthesis of acidic polymer AP-2 was carried out at 80° C. for 1 hour.

Acidic polymer AP-2 had 100% of solid content, 186 mg KOH/g of acid value of polymer and 772 g/mol of theoretical molecular weight.

Synthesis of Acidic Polymer AP-3

0.3 g of KOH, 77.9 g of MPEG-350 and 21.8 g of maleic anhydride were added into a reaction vessel, and the reaction vessel was heated up to 80° C. Synthesis of acidic polymer AP-3 was carried out at 80° C. for 1 hour.

Acidic polymer AP-1 had 100% of solid content, 125 mg KOH/g of acid value of polymer and 448 g/mol of theoretical molecular weight.

Synthesis of Acidic Polymer AP-4

0.1 g of DBSA, 43.7 g of MPEG-350, 27.4 g of ε-caprolactone and 16.1 g of δ-valerolactone were added into a reaction vessel, and the reaction vessel was heated up to 80° C. The reaction was carried out at 80° C. for 1 hour. After that, 12.4 g of succinic anhydride and 0.3 g of KOH were added to the reaction vessel. Synthesis of acidic polymer AP-4 was carried out at 80° C. for 1 hour.

Acidic polymer AP-4 had 100% of solid content, 70 mg KOH/g of acid value of polymer and 780 g/mol of theoretical molecular weight.

Synthesis of Acidic Polymer AP-5

0.1 g of DBSA, 44.9 g of MPEG-350, 28.2 g of ε-caprolactone and 16.5 g of δ-valerolactone were added into a reaction vessel, and the reaction vessel was heated up to 80° C. The reaction was carried out at 80° C. for 1 hour. After that, 10.3 g of PPA was added to the reaction vessel. Synthesis of acidic polymer AP-5 was carried out at 80° C. for 1 hour.

Acidic polymer AP-5 had 100% of solid content, 137 mg KOH/g of acid value of polymer and 875 g/mol of theoretical molecular weight.

Synthesis of Neutralization Product S-1

30.9 g of aminic comb-like copolymer C-1, 9.2 g of acidic polymer AP-1 and 59.9 g of PMA were placed into a reaction vessel, and the reaction vessel was heated up to 80° C. Neutralization reaction was carried out at 80° C. for 1 hour. Experimental results of neutralization product S-1 were described in Table 4.

Synthesis of Neutralization Product S-2-S-24

Neutralization product S-2-S-24 were synthesized using the same procedure as used for neutralization product S-1, except using different types of aminic comb-like copolymers, acidic polymers and components, different molar ratio of amine to acid and different dosage of solvent and Deionized water (Details were described in Table 4).

Synthesis of Alkali-Soluble Resin B1

300 g of PMA was placed into a reaction vessel. 137 g of BzMA, 34 g of methacrylic acid and 1.65 g of AMBN were metered in at a temperature of 120° C. over 180 minutes. The subsequent reaction time after the end of the metering was 120 minutes. The solids content was then adjusted to 35 wt.-% with PMA (DIN EN ISO 3251:2008-06 at 150° C. for 20 min). The number average molecular weight was 7875 g/mol.

TABLE 1

Recipes of aminic comb-like copolymer C-1-C-8 and aminic random copolymer RC-1

| Product name | | C-1 | C-2 | C-3 | C-4 | C-5 | C-6 | C-7 | C-8 | RC-1 |
|---|---|---|---|---|---|---|---|---|---|---|
| Backbone [weight-%] | SMA 1000 | | | | | | 16.3 | | | 52.8 |
| | SMA 2000 | | | 12.8 | 12.0 | | | 20.9 | 21.0 | |
| | SMA 3000 | | | | | 20.4 | | | | |
| | I-SMA 1000 | | 29.1 | | | | | | | |
| | I-SMA 2000 | 39.5 | | | | | | | | |
| Solvent | PMA | | | 19.2 | 18.0 | 30.6 | 16.3 | 31.3 | 31.5 | 85.0 |
| Side Chain [weight-%] | Jeffamine M 2070 | 35.5 | 43.1 | 25.6 | 23.8 | 35.0 | | | | |
| | Jeffamine M 2005 | | | 17.9 | 20.8 | | 81.3 | 50.8 | 76.7 | |
| Pigment affinic groups [weight-%] | DMAPA | 3.9 | 3.3 | 2.1 | 1.8 | 3.5 | 3.7 | 4.6 | 3.5 | 7.2 |
| Solids content [weight-%] | | 100 | 100 | 100 | 100 | 100 | 100 | 100 | 100 | 100 |
| Amine value of polymers [mg KOH/g] | | 37 | 30 | 20 | 17 | 33 | 20 | 33 | 19 | 66 |

TABLE 2

Recipes of quaternized comb-like copolymer QC-1-QC-4

| Product name | | QC-1 | QC-2 | QC-3 | QC-4 |
|---|---|---|---|---|---|
| Intermediate polymer | Name | C-1 | C-2 | C-1 | C-1 |
| | Amount [weight-%] | 38.5 | 37.6 | 38.7 | 39.0 |
| Quaternization agent | BzCl [weight-%] | 2.9 | 2.4 | | 1.0 |
| | BzBr [weight-%] | | | 1.3 | |
| Solvent | PMA [weight-%] | 58.6 | 54.0 | 54.0 | 54.0 |
| | PM (weight-%) | | 6.0 | 6.0 | 6.0 |
| Quaternization degree [mol-%] | | 90 | 90 | 30 | 30 |
| Solids content [weight-%] | | 40 | 40 | 40 | 40 |
| Amine value of polymers [mg KOH/g] | | 4 | 3 | 26 | 26 |

TABLE 3

Recipes of acidic copolymer AP-1-AP-5

| Product name | | AP-1 | AP-2 | AP-3 | AP-4 | AP-5 |
|---|---|---|---|---|---|---|
| Catalyst [weight-%] | KOH | 0.3 | | 0.3 | 0.3 | |
| | DBSA | | 86.0 | | 0.1 | 0.1 |
| Alcohol [weight-%] | Lutensol AO11 | | 86.0 | | | |
| | MPEG-350 | 77.5 | | 77.9 | 43.7 | 44.9 |
| Caprolactone [weight-%] | ε-Caprolactone | | | | 27.4 | 28.2 |
| | δ-Valerolactone | | | | 16.1 | 16.5 |
| Acidic part [weight-%] | Succinic anhydride | 22.2 | | | 12.4 | |
| | Maleic anhydride | | | 21.8 | | |
| | PPA | | 14.0 | | | 10.3 |
| Solids content [weight-%] | | 100 | 100 | 100 | 100 | 100 |
| Molecular weight (theoretical) [g/mol] | | 450 | 772 | 448 | 780 | 875 |
| Acid value of polymers [mg KOH/g] | | 124 | 186 | 125 | 70 | 137 |

TABLE 4

Recipes of neutralization product S-1-S-24

| Product name | Aminic comb-like copolymer | | Acidic polymer or component | | Solvent [weight-%] | | | Neutralization degree [mol-%] | Solids content [weight-%] |
|---|---|---|---|---|---|---|---|---|---|
| | Name | Amount [weight-%] | Name | Amount [weight-%] | PMA | 1-ethoxy-2-propnaol | Water | | |
| S-1 | C-1 | 30.9 | AP-1 | 9.2 | 59.9 | | | 100 | 40 |
| S-2 | C-1 | 31.2 | AP-5 | 8.8 | 60.0 | | | 100 | 40 |
| S-3 | C-2 | 37.6 | AP-3 | 2.3 | 65.1 | | | 25 | 40 |
| S-4 | C-2 | 32.8 | AP-4 | 7.3 | 59.9 | | | 50 | 40 |
| S-5 | C-2 | 38.2 | MAA | 1.8 | 60.0 | | | 100 | 40 |
| S-6 | C-3 | 37.5 | AP-2 | 2.6 | 59.9 | | | 66 | 40 |
| S-7 | C-4 | 36.8 | AP-2 | 3.3 | 59.9 | | | 100 | 40 |
| S-8 | C-5 | 32.0 | AP-5 | 8.0 | 60.0 | | | 100 | 40 |
| S-9 | RC-1 | 34.0 | AP-3 | 6.0 | 60.0 | | | 33 | 40 |
| S-10 | RC-1 | 38.0 | MAA | 2.0 | 60.0 | | | 50 | 40 |
| S-11 | QC-3 | 90.8 | AP-1 | 3.7 | 5.5 | | | 50 | 40 |
| S-12 | QC-4 | 88.4 | AP-2 | 4.8 | 6.8 | | | 100 | 40 |
| S-13 | QC-4 | 84.0 | AP-5 | 6.4 | 9.6 | | | 100 | 40 |
| S-14 | WC-1 | 84.0 | AP-2 | 6.5 | | | 9.5 | 100 | 40 |

TABLE 4-continued

Recipes of neutralization product S-1-S-24

| | Aminic comb-like copolymer | | Acidic polymer or component | | Solvent [weight-%] | | | Neutralization degree [mol-%] | Solids content [weight-%] |
|---|---|---|---|---|---|---|---|---|---|
| Product name | Name | Amount [weight-%] | Name | Amount [weight-%] | PMA | 1-ethoxy-2-propnaol | Water | | |
| S-15 | WC-1 | 91.6 | AP-5 | 3.4 | | | 5.0 | 33 | 40 |
| S-16 | WC-1 | 97.3 | MAA | 1.1 | | | 1.6 | 50 | 40 |
| S-17 | C-6 | 37.7 | PTSA | 2.3 | | 60.0 | | 50 | 40 |
| S-18 | C-7 | 69.8 | PTSA | 5.4 | | 24.8 | | 40 | 70 |
| S-19 | C-7 | 59.3 | AP1 | 15.1 | | 25.6 | | 100 | 70 |
| S-20 | C-7 | 44.2 | BA | 2.4 | | 53.4 | | 100 | 40 |
| S-21 | C-7 | 36.6 | AP2 | 8.9 | | 54.5 | | 100 | 40 |
| S-22 | C-8 | 37.8 | PTSA | 2.2 | | 60.0 | | 100 | 40 |
| S-23 | C-8 | 38.4 | BA | 1.6 | | 60.0 | | 100 | 40 |
| S-24 | C-8 | 67.9 | MAA | 2.1 | | 30.0 | | 100 | 70 |

Preparation of Pigmented Compositions

Production of red, green and blue dispersions used for color filter application
PG-58: Fastogen Green A110 (DIC)
PR-254: Irgaphor Red BT-CF (BASF)
PB-15:6: Fastogen Blue EP-193 (DIC)

General Procedure for Producing Dispersion R-1 Used for Color Filter Application 4.3 g of alkali-soluble resin B1 and 9.4 g of the dispersant S-1, shown in table 4, were placed into a 140 ml glass bottle. After that, 28.8 g of PMA was added to the glass bottle to dissolve the alkali-soluble resin R1 and the dispersant. Then, 7.5 g of PR-254 and 150 g of zirconia beads (diameter: 0.4-0.6 mm) were added into the glass bottle. The dispersion process was performed in a LAU-Disperser DAS 200 over a period of 5 hours at 30° C. After 5 hours, the concentrate was filtered into a 50 ml glass bottle to remove the zirconia beads.

General Procedure for Producing Dispersions R-2-R-5 G-1-G8 and B-1-B-4 Used for Color Filter Application Dispersions R-2-R6, G-1-G-9 and B-1-B-5 were prepared according to the procedure for dispersion R-1 (Details were described in Table 5).

TABLE 5

Recipes of red, green and blue dispersions used for color filter application

| Dispersion | Pigment Name | Amount [g] | Dispersant Product name | Amount [g] | Alkali-soluble resin B1 [g] | Solvent PMA [g] |
|---|---|---|---|---|---|---|
| R-1 | PR-254 | 7.5 | S-1 | 9.4 | 4.3 | 28.8 |
| R-2 | PR-254 | 7.5 | S-3 | 9.4 | 4.3 | 28.8 |
| R-3 | PR-254 | 7.5 | S-4 | 9.4 | 4.3 | 28.8 |
| R-4 | PR-254 | 7.5 | S-10 | 9.4 | 4.3 | 28.8 |
| R-5 | PR-254 | 7.5 | QC-1 | 9.4 | 4.3 | 28.8 |
| G-1 | PG-58 | 7.5 | S-2 | 9.4 | 4.3 | 28.8 |
| G-2 | PG-58 | 7.5 | S-5 | 9.4 | 4.3 | 28.8 |
| G-3 | PG-58 | 7.5 | S-6 | 9.4 | 4.3 | 28.8 |
| G-4 | PG-58 | 7.5 | S-7 | 9.4 | 4.3 | 28.8 |
| G-5 | PG-58 | 7.5 | S-8 | 9.4 | 4.3 | 28.8 |
| G-6 | PG-58 | 7.5 | S-10 | 9.4 | 4.3 | 28.8 |
| G-7 | PG-58 | 7.5 | QC-2 | 9.4 | 4.3 | 28.8 |
| G-8 | PG-58 | 7.5 | C-1 | 6.5 | 4.3 | 31.7 |
| B-1 | PB-15:6 | 7.5 | S-11 | 9.4 | 4.3 | 28.8 |
| B-2 | PB-15:6 | 7.5 | S-12 | 9.4 | 4.3 | 28.8 |
| B-3 | PB-15:6 | 7.5 | S-13 | 9.4 | 4.3 | 28.8 |
| B-4 | PB-15:6 | 7.5 | QC-1 | 9.4 | 4.3 | 28.8 |

Production of Resist Ink

BYK-330: Silicone-typed additive (BYK-Chemie)
Aronix M305: Pentaerythritol triacrylate (TOA GOSEI)
Omnirad 369: Former name: Irgacure 369, 2-benzyl-2-(dimethylamino)-4'-morpholinobutyrophenone (IGM Resins B. V.)
The recipe of the resist inks is described as follows;

| | |
|---|---|
| Dispersion | 50.0 g |
| 2% of BYK-330 PMA solution | 1.0 g |
| Alkali-soluble resin B1 | 14.2 g |
| Aronix M305 | 2.0 g |
| Omnirad 369 | 1.0 g |
| PMA | 31.8 g |
| Total | 100.0 g |

Application Test Results

Viscosity of red, green and blue dispersions
Viscosity of red, green and blue dispersions were measured by using BROOKFIELD VISCOMETER DV-II+ (BROOKFIELD, upper limitation of viscosity: 1000 mPa·s).
Particle size of red, green and blue dispersions:
Particle size (median diameter: D50) of red, green and blue dispersion were measure by using Particle Size Analyzer ELSZ-1000 (Otsuka Electronics).

Developing Property

Red, Green and Blue resist inks were coated to glass plate by using bar coater No. 4 (9.16 μm of thickness at wetting-film), and the coating films were dried at 80° C. for 3 minutes. The dried coating films were gradually dipped to 0.05% KOH aqueous solution (interval: 10-60 seconds). After washing them by water, the coating films were wiped by using KimWipes (Kimberly Clark Corporation product), and marked appearance of coating film described as follows;
1. (Excellent): The coating film was completely eliminated after wiping
2. (Very good): The coating film was partially eliminated after wiping
3. (Good): The coating film was not eliminated, but the surface of the coating film was mostly removed after wiping
4. (Poor): The coating film was not eliminated, but the surface of the coating film was partially removed after wiping
5. (Miserable): The appearance of the coating film didn't change after wiping

Re-Solubility in PMA

Red, Green and Blue resist inks were coated to glass plate by using bar coater No. 4 (9.16 μm of thickness at wet-film), and the coating films were dried at 80° C. for 3 minutes. One droplet of PMA was put on the coating film, and wiped immediately by using KimWipes. The appearance of the coating film after wiping was marked as follows;
1. (Excellent): The coating film in the trace of PMA droplet was completely eliminated after wiping
2. (Very good): The coating film in the trace of PMA droplet was partially eliminated after wiping
3. (Good): The coating film in the trace of PMA was not eliminated, but the surface of the coating film was mostly removed after wiping
4. (Poor): The coating film was in the trace of PMA not eliminated, but the surface of the coating film was partially removed after wiping
5. (Miserable): The appearance of the coating film didn't change after wiping Example 1-10: Viscosity and Particle Size of Red (R), Green (G) and Blue (B) Dispersions, and Developing Property and Re-Solubility in PMA of Red (R), Green (G) and Blue (B) Resist Inks Viscosity (mPa·s at 20° C., rotation: 60 rpm) and particle size (D50) of red, green and blue dispersions as well as developing property and re-solubility in PMA of red, green and blue resist inks were described in Table 6.

TABLE 6

Viscosity and particle size of red, green and blue dispersions, and developing property and re-solubility in PMA of red, green and blue resist inks

| | | Viscosity (mPa · s) of dispersion (60 rpm) | | Particle size (D50)/ nm | Property of resist ink | |
|---|---|---|---|---|---|---|
| Examples | Dispersion | Initial | Storage at 40° C. for 5 days | | Developing property | Re-solubility in PMA |
| 1 | R-1 | 5.8 | 6.0 | 72 | 2 | 1 |
| 2 | R-2 | 6.0 | 6.2 | 75 | 1 | 2 |
| 3 | R-3 | 5.6 | 5.6 | 74 | 2 | 1 |
| 4 | G-1 | 5.1 | 5.3 | 63 | 1 | 1 |
| 5 | G-3 | 4.9 | 5.0 | 57 | 1 | 1 |
| 6 | G-4 | 4.8 | 4.8 | 59 | 1 | 1 |
| 7 | G-5 | 5.4 | 5.5 | 60 | 1 | 1 |
| 8 | B-1 | 5.5 | 5.4 | 60 | 2 | 1 |
| 9 | B-2 | 5.0 | 5.1 | 58 | 1 | 1 |
| 10 | B-3 | 4.8 | 4.8 | 56 | 1 | 1 |

Comparison example C-1 to C-7: Viscosity and particle size of red (R), green (G) and blue (B) dispersions, and developing property and re-solubility in PMA of red, green and blue resist inks;

Viscosity (mPa·s at 20° C., rotation: 60 rpm) and particle size (D50) of red, green and blue dispersions are described in Table 8, and developing property and re-solubility in PMA of red, green and blue resist inks were described in Table 7.

TABLE 7

Viscosity and particle size of red, green and blue dispersions, and developing property and re-solubility in PMA of red, green and blue resist inks

| Comparison examples | Dispersion | Viscosity (mPa · s) of dispersion (60 rpm) Initial | Storage at 40° C. for 5 days | Particle size (D50)/ nm | Property of resist ink Developing property | Re-solubility in PMA |
|---|---|---|---|---|---|---|
| C-1 | R-4 | >100 | Gelation | 86 | — | — |
| C-2 | R-5 | 6.4 | 6.8 | 82 | 2 | 4 |
| C-3 | G-2 | 6.0 | 7.1 | 73 | 3 | 4 |
| C-4 | G-6 | 6.0 | 7.8 | 74 | 4 | 4 |
| C-5 | G-7 | >100 | Gelation | 80 | — | — |
| C-6 | G-8 | >100 | Gelation | 76 | — | — |
| C-7 | B-4 | 5.1 | 5.2 | 56 | 2 | 5 |

According to the results in Table 6 and 7, red, green and blue dispersions including neutralized product between aminic comb-like copolymer and acidic polymer showed excellent dispersibility and storage stability (Example 1-10). Moreover, red, green and blue resist inks including the dispersions also showed excellent developing property and re-solubility in PMA.

However, green dispersions including neutralized product between aminic comb-like copolymer and low molecular weight of acidic component (Comparison example C-3, and C-4) showed poor storage stability, and their resist inks showed poor developing property and re-solubility in PMA.

The red dispersion including neutralized product between aminic (non-comb-like) copolymer and acidic polymer or low molecular weight of acidic component (Comparison example C-1) showed poor dispersibility.

Green dispersions including aminic comb-like copolymer (Comparison example C-6) and quaternized comb-like copolymer (Comparison example C-5) showed poor dispersibility.

Red and blue dispersions including quaternized comb-like copolymer (Comparison example C-2 and C-7) showed better dispersibility and storage stability, however, their resist inks showed poor re-solubility in PMA.

Production of Carbon Black Dispersions Used for Solvent-Based Jetness Coating

Raven U3: Raven 5000 Ultra 3 (Birla Carbon)
PMA: 1-Methoxy-2-propyl acetate (DOW Chemicals)

General Procedure for Producing Solvent-Based Carbon Black Dispersion Bk-1

9.7 g of a dispersant S-1 was placed into a 140 ml glass bottle. After that, 36.0 g of PMA was added to the glass bottle to dissolve the dispersant in PMA. Then, 4.3 g of Raven 5000 Ultra 3 (Raven U3) and 150 g of zirconia beads (diameter: 0.4-0.6 mm) were added into the glass bottle. Dispersion process was performed in a LAU-Disperser DAS 200 over a period of 10 hours at 30° C. After 10 hours, the concentrate was filtered into a 50 ml glass bottle to remove the zirconia beads.

General Procedure for Producing Carbon Black Solvent-Based Dispersion Bk-2-Bk-6

Solvent-based dispersions Bk-2-Bk-6 were according to the procedure dispersion Bk-1 (Details were described in Table 8).

TABLE 8

Recipes of solvent-based carbon black dispersions Bk-1-Bk-6

| | Pigment | | Dispersant | | Solvent |
|---|---|---|---|---|---|
| Dispersion | Name | Amount [g] | Product name | Amount [g] | PMA [g] |
| Bk-1 | Raven U3 | 4.3 | S-1 | 9.7 | 36.0 |
| Bk-2 | Raven U3 | 4.3 | S-5 | 9.7 | 36.0 |
| Bk-3 | Raven U3 | 4.3 | S-6 | 9.7 | 36.0 |
| Bk-4 | Raven U3 | 4.3 | S-8 | 9.7 | 36.0 |
| Bk-5 | Raven U3 | 4.3 | C-1 | 9.7 | 36.0 |
| Bk-6 | Raven U3 | 4.3 | QC-1 | 9.7 | 36.0 |

Example 11-13: Viscosity and Particle Size of Solvent-Based Carbon Black Dispersions Bk-1, Bk-3 and Bk-4

Viscosity (mPa·s at 20° C., rotation: 60 rpm) and particle size (D50) of solvent-based carbon black dispersions Bk-1, Bk-2 and Bk-4 were described in Table 9.

TABLE 9

Viscosity and particle size of solvent-based carbon black dispersions Bk-1, Bk-3 and Bk-4

| Examples | Dispersion | Viscosity (mPa·s) of dispersion (60 rpm) Initial | Storage at 40° C. for 5 days | Particle size (D50)/nm |
|---|---|---|---|---|
| 11 | Bk-1 | 27 | 28 | 92 |
| 12 | Bk-3 | 11 | 12 | 80 |
| 13 | Bk-4 | 19 | 19 | 83 |

Comparison Example 8-10: Viscosity and Particle Size of Solvent-Based Carbon Black Dispersions Bk-2, Bk-5 and Bk-6

Viscosity (mPa·s at 20° C., rotation: 60 rpm) and particle size (D50) of solvent-based carbon black dispersions Bk-2, Bk-5 and Bk-6 were described in Table 10.

TABLE 10

Viscosity and particle size of solvent-based carbon black dispersions Bk-2, Bk-5 and Bk-6

| Comparison examples | Dispersion | Viscosity (mPa·s) of dispersion (60 rpm) Initial | Storage at 40° C. for 5 days | Particle size (D50)/nm |
|---|---|---|---|---|
| C-8 | Bk-2 | 24 | 56 | 86 |
| C-9 | Bk-5 | >100 | Gelation | 225 |
| C-10 | Bk-6 | 19 | 34 | 84 |

According to the results in Table 9 and 10, solvent-based black dispersions including neutralized product between aminic comb-like copolymer and acidic polymer showed promising results as solvent-based carbon black dispersion which were used for coatings for transportation vehicles (Example 11-13).

On the other hand, the black dispersion including neutralized product between aminic comb-like copolymer and low molecular weight of acidic component (Comparison example C-8) and the black dispersion including quatemized comb-like copolymer (Comparison example C-9) showed poor storage stability. Moreover, the black dispersion including aminic comb-like copolymer (Comparison example C-10) showed poor dispersibility.

Production of Blue Dispersions Used for Waterborne Blue Coating

G314: Cyanine Blue G-314 (Sanyo Color)
BYK-011: Polymer-typed defoamer (BYK-Chemie)
DYN 800N: BYK-DYNWET 800N, Wetting agent (BYK-Chemie)

General Procedure for Producing Waterborne Blue Dispersion Bl-1

31.4 g of deionized water, 0.3 g of BYK-011 and 0.80 g of BYK-DYNWET 800N were placed into a 140 ml glass bottle. After that, 7.50 g of dispersant S-15 was added to the glass bottle to dissolve the dispersant in deionized water. Then, 10.00 g of Cyanine Blue G-314 and 150 g of zirconia beads (diameter: 0.4-0.6 mm) were added into the glass bottle. Dispersion process was performed in a LAU-Disperser DAS 200 over a period of 8 hours at 30° C. After the grinding, the concentrate was filtered into a 50 ml glass bottle to remove the zirconia beads.

General Procedure for Producing Waterborne Blue Dispersion Bl-2-Bl-4

Waterborne blue dispersions Bl-2-Bl-4 were according to the procedure dispersion Bl-1 (Details were described in Table 11).

TABLE 11

Recipes of waterborne blue dispersion Bl-1-Bl-4

| Dispersion | Pigment Name | Amount [g] | Dispersant Product name | Amount [g] | BYK-011 Amount [g] | DYN 800N Amount [g] | Deionized water [g] |
|---|---|---|---|---|---|---|---|
| Bl-1 | G-314 | 10.0 | S-14 | 7.5 | 0.3 | 0.8 | 31.4 |
| Bi-2 | G-314 | 10.0 | S-15 | 7.5 | 0.3 | 0.8 | 31.4 |
| Bl-3 | G-314 | 10.0 | S-16 | 7.5 | 0.3 | 0.8 | 31.4 |
| Bl-4 | G-314 | 10.0 | WC-1 | 7.5 | 0.3 | 0.8 | 31.4 |

Example 14-15: Viscosity and Particle Size of Waterborne Blue Dispersion Bl-1-Bl-2

Viscosity (mPa·s at 20° C., rotation: 60 rpm) and particle size (D50) of waterborne blue dispersion Bl-1-Bl-2 were described in Table 12.

TABLE 12

Viscosity and particle size of waterborne blue dispersion Bl-1-Bl-2

| Examples | Dispersion | Viscosity (mPa · s) of dispersion (60 rpm) Initial | Storage at 40° C. for 7 days | Particle size (D50)/nm |
|---|---|---|---|---|
| 14 | Bl-1 | 18 | 16 | 77 |
| 15 | Bl-2 | 19 | 17 | 79 |

Comparison Example 11-12: Viscosity and Particle Size of Waterborne Blue Dispersion Bl-3-Bl-4

Viscosity (mPa·s at 20° C., rotation: 60 rpm) and particle size (D50) of Viscosity and particle size of waterborne blue dispersion Bl-3-Bl-4 were described in Table 13.

TABLE 13

Viscosity and particle size of waterborne blue dispersion Bl-3-Bl-4

| Comparison examples | Dispersion | Viscosity (mPa · s) of dispersion (60 rpm) Initial | Storage at 40° C. for 7 days | Particle size (D50)/nm |
|---|---|---|---|---|
| C-11 | Bl-3 | 24 | 56 | 86 |
| C-12 | Bl-4 | >100 | Gelation | 359 |

According to the results in Table 12 and 13, waterborne blue dispersions including neutralized product between aminic comb-like copolymer and acidic polymer showed promising results as waterborne blue dispersion which were used for coatings for transportation vehicles (Example 14-15).

On the other hand, the blue dispersion including neutralized product between aminic comb-like copolymer and low molecular weight of acidic component (Comparison example C-11) showed poor storage stability. Moreover, the blue dispersion including aminic comb-like copolymer (Comparison example C-12) showed poor dispersibility.

Production of Black Dispersions Used for Battery Application

Denka black: Denka black (Granular) (Denka)
BYK-017: Polymer-typed defoamer (BYK-Chemie)

General Procedure for Producing Waterborne Black Dispersion WBk-1

15.2 g of deionized water, 0.1 g of BYK-017 were placed into a 70 ml glass bottle. After that, 0.70 g of dispersant S-15 was added to the glass bottle to dissolve the dispersant in deionized water. Then, 4.0 g of Denka black and 60 g of zirconia beads (diameter: 2.0 mm) were added into the glass bottle. Dispersion process was performed in a LAU-Disperser DAS 200 over a period of 3 hours at 30° C. After the grinding, the concentrate was filtered into a 50 ml glass bottle to remove the zirconia beads.

General Procedure for Producing Waterborne Black Dispersion WBk-2-WBk-4

Waterborne black dispersions WBk-2-WBk-4 were according to the procedure dispersion WBk-1 (Details were described in Table 14).

TABLE 14

Recipes of waterborne black dispersion WBk-2-WBk-4

| | Pigment | | Dispersant | | BYK-017 | Deionized |
|---|---|---|---|---|---|---|
| Dispersion | Name | Amount [g] | Product name | Amount [g] | Amount [g] | water [g] |
| WBk-1 | Denka black | 4.0 | S-14 | 0.7 | 0.1 | 15.2 |
| WBk-2 | Denka black | 4.0 | S-15 | 0.7 | 0.1 | 15.2 |
| WBk-3 | Denka black | 4.0 | S-16 | 0.7 | 0.1 | 15.2 |
| WBk-4 | Denka black | 4.0 | WC-1 | 0.7 | 0.1 | 15.2 |

Example 16-17: Viscosity and Particle Size of Waterborne Black Dispersion WBk-1-WBk-2

Viscosity (mPa·s at 20° C., rotation: 60 rpm and 6 rpm) and particle size (D50) of waterborne black dispersion WBk-1-WBk-2 were described in Table 15.

TABLE 15

Viscosity and particle size of waterborne black dispersion WBk-1-WBk-2

| | | Viscosity (mPa · s) of dispersion | | Particle |
|---|---|---|---|---|
| Examples | Dispersion | Rotation: 60 rpm | Rotation: 6 rpm | size (D50)/nm |
| 16 | WBk-1 | 10 | 14 | 421 |
| 17 | WBk-2 | 8 | 12 | 397 |

Comparison Example 13-14: Viscosity and Particle Size of Waterborne Black Dispersion WBk-3-WBk-4

Viscosity (mPa·s at 20° C., rotation: 60 rpm and 6 rpm) and particle size (D50) of Viscosity and particle size of waterborne black dispersion WBk-3-WBk-4 were described in Table 16.

TABLE 16

Viscosity and particle size of waterborne black dispersion WBk-3-WBk-4

| | | Viscosity (mPa · s) of dispersion | | Particle |
|---|---|---|---|---|
| Comparison examples | Dispersion | Rotation: 60 rpm | Rotation: 6 rpm | size (D50)/nm |
| C-13 | WBk-3 | 16 | 32 | 442 |
| C-14 | WBk-4 | 966 | 10980 | 515 |

According to the results in Table 15 and 16, waterborne black dispersions including neutralized product between aminic comb-like copolymer and acidic polymer showed promising results as waterborne black dispersion which were used for lithium ion battery (Example 16-17).

On the other hand, the black dispersion including neutralized product between aminic comb-like copolymer and low molecular weight of acidic component (Comparison example C-13) showed a thixotropic phenomenon. Moreover, the black dispersion including aminic comb-like copolymer (Comparison example C-14) showed poor dispersibility and high viscosity.

Production of Blue Dispersions Used for Solvent-Based Blue Coating

Heliogen Blue L7110F beta phthalocyanine blue organic pigment (BASF)
Ethanol
Ethyl acetate General Procedure for Producing Solvent-Based Blue Dispersion SB-1

29.4 g of a 9:1 mixture of ethanol/ethyl acetate was placed into 100 ml glass bottle and 5.6 g of dispersant S-17 was added. Then, 15.0 g of Heliogen Blue L7110F and 50 g of zirconia beads (diameter 1.0-1.3 mm) were added into the glass bottle. The dispersion process was performed in a LAU-Disperser DAS 200 over a period of 60 min.

General Procedure for Producing Solvent-Based Blue Dispersion SB-2-SB-11

Solven-based blue dispersions SB-2-SB-11 were according to the procedure dispersion SB-1 (Details were described in Table 17).

TABLE 17

Recipes of solvent-based blue dispersion SB-2-SB-11

| | Pigment | | Dispersant | | EtOH/EAc |
|---|---|---|---|---|---|
| Dispersion | Name | Amount [g] | Product name | Amount [g] | (9:1) [g] |
| SB-2 | L7110F | 15.0 | S-18 | 3.2 | 31.8 |
| SB-3 | L7110F | 15.0 | S-19 | 3.2 | 31.8 |
| SB-4 | L7110F | 15.0 | S-20 | 5.6 | 29.4 |
| SB-5 | L7110F | 15.0 | S-21 | 3.2 | 31.8 |
| SB-6 | L7110F | 15.0 | S-22 | 5.6 | 29.4 |
| SB-7 | L7110F | 15.0 | S-23 | 5.6 | 29.4 |
| SB-8 | L7110F | 15.0 | S-24 | 3.2 | 31.8 |
| SB-9 | L7110F | 15.0 | C-6 | 2.3 | 32.8 |
| SB-10 | L7110F | 15.0 | C-7 | 3.0 | 32.0 |
| SB-11 | L7110F | 15.0 | C-8 | 3.2 | 31.8 |

Example 18-24: Viscosity and Particle Size of Solvent-Based Blue Dispersion SB-1-SB-7

Viscosity of solvent-based blue dispersion SB-1-SB-7 were described in Table 18.

TABLE 18

Viscosity and particle size of solvenbased blue dispersion SB-1-SB-7

| | | Viscosity (mPa · s) of dispersion | | Particle size |
|---|---|---|---|---|
| Examples | Dispersion | 10 rpm | 100 rpm | (D90)/nm |
| 18 | SB-1 | 12.4 | 7.3 | 314 |
| 19 | SB-2 | 7.5 | 6.8 | 339 |
| 20 | SB-3 | 11.0 | 8.8 | 342 |
| 21 | SB-4 | 9.2 | 7.4 | 332 |
| 22 | SB-5 | 12.9 | 8.3 | 361 |
| 23 | SB-6 | 7.7 | 7.4 | 301 |
| 24 | SB-7 | 10.7 | 9.2 | 324 |

Comparison Example 15-18: Viscosity and Particle Size of Solvent-Based Blue Dispersion SB-8-SB-11

Viscosity and particle size of Viscosity and particle size of solvent-based blue dispersion SB-8-SB-11 were described in Table 19.

TABLE 19

Viscosity and particle size of waterborne blue dispersion SB-8-SB-11

| Comparison examples | Dispersion | Viscosity (mPa·s) of dispersion | | Particle size |
|---|---|---|---|---|
| | | 10 rpm | 100 rpm | (D90)/nm |
| C-15 | SB-8 | 15.0 | 14.1 | 369 |
| C-16 | SB-9 | 698.3 | 187.7 | 453 |
| C-17 | SB-10 | 741.2 | 206.0 | 485 |
| C-18 | SB-11 | 769.7 | 209.1 | 429 |

According to the results in Table 18 and 19, solvent-based blue dispersions including neutralized product between aminic comb-like copolymer and acidic polymer showed promising results as solvent-based blue dispersion which were used for printing inks (Example 18-25).

On the other hand, the blue dispersion including neutralized product between aminic comb-like copolymer and low molecular weight of acidic component (Comparison example C-15) showed a higher viscosity. Moreover, the blue dispersion including aminic comb-like copolymers (Comparison example C-16-18) showed poor dispersibility.

The invention claimed is:

1. A comb polymer having a polymer backbone, wherein the polymer backbone comprises polymerized units of vinyl aromatic hydrocarbon monomers, and lateral side chains linked to the polymer backbone, wherein the lateral side chains comprise
    a) alkyl ether terminated polyalkylene oxide side chains, and
    b) tertiary amine-functional side chains including tertiary amine groups at least partly neutralized by an acid having a molecular weight in a range of 100 g/mol to 2000 g/mol, wherein if the acid comprises a polymeric acid, the polymeric acid comprises a polyether segment or a polyester segment, and the molecular weight relates to the number average molecular weight Mn, determined by gel permeation chromatography using polystyrene standards for calibration,
and wherein the lateral side chains a) and b) are distributed in random order.

2. The comb polymer according to claim 1, wherein the acid has a molecular weight in the range of 150 to 2000 g/mol.

3. The comb polymer according to claim 1, wherein the acid comprises an acidic group comprising at least one of a carboxylic acid group, a phosphoric acid group, and a sulfonic acid group.

4. The comb polymer according to claim 1, wherein at least 5 mol-% of the tertiary amine groups are neutralized by the acid.

5. The comb polymer according claim 1, wherein the alkyl ether terminated polyalkylene oxide side chains are linked to the polymer backbone via imide groups.

6. The comb polymer according to claim 1, wherein the tertiary amine-functional side chains are linked to the polymer backbone via imide groups.

7. The comb polymer according to claim 1, wherein the polymer backbone comprises polymerized units of N-substituted maleic imide.

8. The comb polymer according to claim 1, wherein the amine value of the comb polymer is in the range of 5 to 150 mg KOH/g.

9. A composition comprising
the comb polymer according to claim 1,
at least one colorant, and
at least one diluent.

10. The composition according to claim 9, further comprising a film-forming binder.

11. A composition comprising the comb polymer according to claim 1, and solid particles.

12. The composition according to claim 11, wherein the solid particles comprise at least one of a pigment, a dye, and a filler.

13. A process comprising dispersing solid particles in a liquid dispersion medium comprising the comb polymer according to claim 1.

14. A composition comprising the comb polymer according to claim 1, and a dye.

\* \* \* \* \*